US012597628B2

(12) United States Patent
    Zhao et al.

(10) Patent No.: US 12,597,628 B2
(45) Date of Patent: *\*Apr. 7, 2026**

(54) WINDING DEVICE

(71) Applicant: Wuxi Lead Intelligent Equipment Co., Ltd., Wuxi (CN)

(72) Inventors: Liujie Zhao, Wuxi (CN); Fengjie Wang, Wuxi (CN)

(73) Assignee: Wuxi Intelligent Equipment Co. Ltd., Wuxi (CN)

( * ) Notice: Subject to any disclaimer, the term of this patent is extended or adjusted under 35 U.S.C. 154(b) by 238 days.

This patent is subject to a terminal disclaimer.

(21) Appl. No.: 18/515,831

(22) Filed: Nov. 21, 2023

(65) Prior Publication Data

US 2024/0105980 A1      Mar. 28, 2024

Related U.S. Application Data

(63) Continuation of application No. PCT/CN2022/130623, filed on Nov. 8, 2022.

(51) Int. Cl.
    *H01M 10/04*       (2006.01)
    *B65H 18/02*       (2006.01)
         (Continued)

(52) U.S. Cl.
    CPC .... *H01M 10/0409* (2013.01); *B65H 18/0212* (2020.08); *B65H 18/085* (2013.01);
         (Continued)

(58) Field of Classification Search
    CPC .......... B65H 18/0212; B65H 19/2223; H01M 10/0409; H01M 10/0587
    See application file for complete search history.

(56) References Cited

U.S. PATENT DOCUMENTS

| | | | | | |
|---|---|---|---|---|---|
| 11,949,059 | B2 * | 4/2024 | Wu | .................. | H01M 10/0431 |
| 2022/0393222 | A1 * | 12/2022 | Kim | .................. | B65H 23/0204 |

FOREIGN PATENT DOCUMENTS

| | | |
|---|---|---|
| CN | 103985894 A | 8/2014 |
| CN | 113131009 A | 7/2021 |

(Continued)

OTHER PUBLICATIONS

English machine translation of CN103985894 (Year: 2013).*
English translation of JP2014038784 (Year: 2014).*

*Primary Examiner* — Scott W Dodds
(74) *Attorney, Agent, or Firm* — Baker Botts LLP

(57)      ABSTRACT

A winding device includes: a first unwinding equipment, a second unwinding equipment, a third unwinding equipment and a fourth unwinding equipment, respectively configured for outputting a first diaphragm, a cathode pole piece, a second diaphragm and an anode pole piece; a merging equipment, configured for merging passing material strip layers; a pole-piece-inserting equipment, configured for cutting off the passing cathode pole piece, and transporting a starting end of the cathode pole piece downstream; a winding equipment, including a turret and at least two winding needles, the turret is adapted to drive each of the winding needles to pass by a first station and a second station sequentially; and a guiding roller, the layers of material strip located between the first station and the second station winding through the guiding roller.

14 Claims, 5 Drawing Sheets

(51) Int. Cl.
    *B65H 18/08*            (2006.01)
    *B65H 19/22*            (2006.01)
    *B65H 35/00*            (2006.01)

(52) U.S. Cl.
    CPC ..... *B65H 19/2223* (2013.01); *B65H 35/0006*
           (2013.01); *B65H 2404/10* (2013.01); *B65H*
                               *2701/19* (2013.01)

(56)                References Cited

FOREIGN PATENT DOCUMENTS

| | | | | |
|---|---|---|---|---|
| CN | 216750029 U | | 6/2022 | |
| JP | 2014038784 A | * | 2/2014 | ........ H01M 10/0587 |
| JP | 2014154457 A | | 8/2014 | |
| JP | 2016001620 A | | 1/2016 | |

* cited by examiner d2 f ─── f d1 d2 f3 f1 ─── f2 d1

WINDING DEVICE

CROSS-REFERENCE TO RELATED APPLICATIONS

This application is a National Stage of International Application No. PCT/CN2022/130623, filed on Nov. 8, 2022, which claims priority to Chinese Patent Application No. 202122778570.1, filed on Nov. 12, 2021, both of which are hereby incorporated by reference in their entireties.

TECHNICAL FIELD

The present disclosure relates to the field of battery manufacturing device, and specifically, to a winding device.

BACKGROUND

A cell is an important part of a lithium-ion battery, which is generally formed by a winding of four layers of material strips including a diaphragm, a cathode pole piece, another diaphragm and an anode pole piece. However, the existing winding device cannot implement continuous winding; after each cell is wound, two pole-piece-inserting equipment are required to insert respectively the anode pole piece and the cathode pole piece into the needle-winding mechanism. This seriously affects the winding efficiency of the cell, since it takes a long time for the inserting action of the anode pole piece and the cathode pole piece.

SUMMARY

Based on this, it is necessary to provide a winding device to address the above defect in view of the problem that the winding efficiency of the cell is seriously affected since it takes a long time for the insertion of the anode pole piece and the cathode pole piece after each cell is wound by a prior art winding device.

A winding device includes:

a first unwinding equipment, a second unwinding equipment, a third unwinding equipment and a fourth unwinding equipment, respectively configured for outputting a first diaphragm, a cathode pole piece, a second diaphragm and an anode pole piece;

a merging equipment, arranged downstream of the first unwinding equipment, the second unwinding equipment, the third unwinding equipment and the fourth unwinding equipment, and configured for merging a passing first diaphragm, a passing cathode pole piece, a passing second diaphragm and a passing anode pole piece, or configured for merging the passing first diaphragm, the passing second diaphragm and the passing anode pole piece;

a pole-piece-inserting equipment, arranged between the merging equipment and the second unwinding equipment, configured for cutting off the passing cathode pole piece, and further configured for transporting a starting end of the cathode pole piece downstream to the merging equipment;

a winding equipment, including a turret and at least two winding needles mounted on the turret; the turret being rotatably provided so as to drive each of the winding needles to pass by a first station and a second station sequentially, and the first station being located downstream of the merging equipment; and a guiding roller, arranged between the first station and the second station; when the winding needle at the first station rotates to the second station along with the turret, the other winding needle rotates to the first station, and the first diaphragm, the second diaphragm and the anode pole piece located between the first station and the second station wind through the guiding roller; guidance of the guiding roller enabling the winding needle at the first station to hold the first diaphragm, the second diaphragm and the anode pole piece passing by the first station;

a cutter equipment, arranged between the first station and the second station, and configured for cutting off the passing first diaphragm, the passing second diaphragm and the passing anode pole piece in one time after winding of a trailing end of the cathode pole piece is wound onto the winding needle at the first station.

In one of the embodiments, the pole-piece-inserting equipment includes a first holding assembly, a first cutting assembly and a pole-piece-inserting assembly, the first holding assembly is arranged on an upstream side of the pole-piece-inserting assembly, and the first cutting assembly is arranged between the first holding assembly and the pole-piece-inserting assembly;

the first holding assembly is configured for clamping or releasing the passing cathode pole piece and can be controlled to get close to or away from the first cutting assembly, the first cutting assembly is configured for cutting off the passing cathode pole piece, and the pole-piece-inserting assembly is configured for transporting the passing cathode pole piece downstream.

In one of the embodiments, the pole-piece-inserting assembly has two pole-piece-inserting rollers provided oppositely, the two pole-piece-inserting rollers forming a first transporting passage therebetween for the cathode pole piece to pass through, and at least one of the two pole-piece-inserting rollers can be controlled to get close to or away from the other one, and each of the two pole-piece-inserting rollers is rotatable about its own axis.

In one of the embodiments, the two pole-piece-inserting rollers can be controlled to move along its axial direction so as to drive the cathode pole piece clamped by the two pole-piece-inserting rollers for alignment.

In one of the embodiments, the winding device further includes a pole-piece-processing equipment arranged between the fourth unwinding equipment and the merging equipment;

the pole-piece-processing equipment is configured for cutting off the passing anode pole piece, is configured for separating from each other an upstream cut-off end and a downstream cut-off end formed after cut-off of the anode pole piece, and is configured for connecting the upstream cut-off end and the downstream cut-off end with a tape; the tape between the upstream cut-off end and the downstream cut-off end forms a tape portion;

the cutter equipment is configured for cutting off the passing first diaphragm, the passing second diaphragm and the tape portion on the passing anode pole piece in one time.

In one of the embodiments, the pole-piece-processing equipment includes a first holding-transporting assembly, a cutter assembly, a gluing assembly and a second holding-transporting assembly disposed sequentially from upstream to downstream;

both the first holding-transporting assembly and the second holding-transporting assembly are configured for holding the passing anode pole piece and can move downstream, the cutter assembly being configured for cutting off the passing anode pole piece, the cut off anode pole piece forming the upstream cut-off end and the downstream cut-off end;

during downstream moving, the first holding-transporting assembly and the second holding-transporting assembly can drive the upstream cut-off end and the downstream cut-off end respectively to move to the gluing assembly, the upstream cut-off end and the downstream cut-off end are separated from each other, and the gluing assembly is configured for bonding the upstream cut-off end to the downstream cut-off end with the tape.

In one of the embodiments, when the first holding-transporting assembly and the second holding-transporting assembly drive the upstream cut-off end and the downstream cut-off end respectively to move to the gluing assembly, the second holding-transporting assembly moves a distance greater than that the first holding-transporting assembly moves.

In one of the embodiments, the gluing assembly is configured for bonding the upstream cut-off end to the downstream cut-off end with the tape from one side of the anode pole piece.

In one of the embodiments, the gluing assembly is configured for bonding the upstream cut-off end to the downstream cut-off end with two tapes from two sides of the anode pole piece.

In one of the embodiments, the tape include a first tape, a second tape and a third tape, the gluing assembly is configured for bonding the upstream cut-off end to the downstream cut-off end with the first tape from a first side of the anode pole piece, and is configured for bonding the upstream cut-off end to the first tape with the second tape from a second side of the anode pole piece, and is configured for bonding the downstream cut-off end to the first tape with the third tape from the second side of the anode pole piece.

In one of the embodiments, the winding device further includes a feeding equipment arranged between the fourth unwinding equipment and the merging equipment;

the feeding equipment includes a feeding assembly having two feeding rollers provided oppositely, the two feeding rollers form a second transporting passage for the anode pole piece to pass through, at least one of the two feeding rollers can be controlled to get close to or away from the other one, and each of the two feeding rollers is rotatable about its own axis.

In one of the embodiments, the feeding equipment further include a second holding assembly arranged on an upstream side of the feeding assembly, and a second cutting assembly arranged between the second holding assembly and the feeding assembly;

the second holding assembly is configured for clamping or releasing the passing anode pole piece, and can be controlled to get close to or away from the second cutting assembly, and the second cutting assembly is configured for cutting off the passing anode pole piece.

In one of the embodiments, the two feeding rollers can be controlled to move along its axial direction so as to drive the anode pole piece clamped by the two feeding rollers for alignment.

In one of the embodiments, the merging equipment has a first merging roller and a second merging roller disposed oppositely, and the first merging roller and the second merging roller form a merging passage therebetween, and the merging passage is configured for the first diaphragm, the cathode pole piece, the second diaphragm and the anode pole piece to pass through, or is configured for the first diaphragm, the second diaphragm and the anode pole piece to pass through;

at least one of the first merging roller and the second merging roller can be controlled to get close to or away from the other one, and both the first merging roller and the second merging roller are rotatable about their own axes.

In one of the embodiments, the turret is mounted with three winding needles disposed at intervals in a rotating direction of the turret; the winding equipment further has a third station, and during rotating along with the turret, the three winding needles pass by the first station, the second station and the third station sequentially; when one of the winding needles is located at the first station, the other two winding needles are respectively located at the second station and the third station;

there are provided three guiding rollers, and there are provided with the guiding roller between each adjacent two winding needles.

With regard to the above winding device, during actual winding operation, the first unwinding equipment, the second unwinding equipment, the third unwinding equipment and the fourth unwinding equipment are unwound and output the first diaphragm, the cathode pole piece, the second diaphragm, and the anode pole piece to the merging equipment respectively. The first diaphragm, the cathode pole piece, the second diaphragm, and the anode pole piece are merged by the merging equipment, and the first diaphragm, the cathode pole piece, the second diaphragm, and the anode pole piece, which are merged, are further transported to the winding needle at the first station. The winding needle at the first station revolves on its axis to wind the first diaphragm, the cathode pole piece, the second diaphragm, and the anode pole piece, which are merged, to form a cell.

When winding of one cell is completed, the pole-piece-inserting equipment cuts off the passing cathode pole piece, and the winding needle at the first station continues winding the first diaphragm, the cathode pole piece, the second diaphragm, and the anode pole piece, until the trailing end of the cathode pole piece is wrapped inside the cell formed by winding. Then, the winding needle at the first station rotates to the second station along with the turret, while the other winding needle rotates to the first station along with the turret. At this time, due to the rotation of the turret, the first diaphragm, the second diaphragm and the anode pole piece located between the first station and the second station are wound around the guiding roller, and the guidance of the guiding roller enable the first diaphragm, the second diaphragm and the anode pole piece winding through the first station to align with the slit of the winding needle at the first station, such that when the winding needle at the first station extends, the first diaphragm, the second diaphragm, and the anode pole piece can enter into the slit of the winding needle to be clamped and fixed. Then, the cutter equipment cuts off the first diaphragm, the second diaphragm and the anode pole piece between the first station and the second station (that is, the cutter equipment cuts off the first diaphragm, the second diaphragm and the anode pole piece in one time), such that the cell on the winding needle at the second station is separated from the first diaphragm, the second diaphragm and the anode pole piece so as to facilitate the subsequent processing and unloading of the cell on the winding needle. In addition, since the first diaphragm, the second diaphragm, and the anode pole piece that are downstream of the merging equipment are located in the slit of the winding needle at the first station, the winding and forming of the next cell only needs to be performed after the starting end of the cathode pole piece is transported downstream by the pole-piece-inserting equipment and passed through the merging equipment and through the slit of the winding needle at the first station sequentially, without pole-piece-inserting operation of the anode pole piece. That is to say, when the forming of one cell is completed, in order to further wind the next cell, the pole-piece-inserting operation only needs to be performed with the cathode pole piece, and does not need to be performed with the anode pole piece, thereby greatly reducing the transition time between forming of two cells and improves the production efficiency.

BRIEF DESCRIPTION OF THE DRAWINGS

In order to more clearly illustrate embodiments of the present application or technical solutions in the prior art, accompanying drawings that need to be used in description of the embodiments or the prior art will be briefly introduced as follows. Obviously, drawings in following description are only the embodiments of the present application. For those skilled in the art, other drawings can also be obtained according to the disclosed drawings without creative efforts.

DETAILED DESCRIPTION

The technical solutions in the embodiments of the present application will be clearly and completely described later in conjunction with the accompanying drawings in the embodiments of the present application. Obviously, the described embodiments are only a part of the embodiments of the present application, and not all of them. Based on the embodiments in the present application, all other embodiments obtained by a person of ordinary skill in the art without making creative labor fall within the scope of protection of the present application.

In addition, terms "first" and "second" are only used for descriptive purposes, and should not be understood as indicating or implying relative importance or implying a number of indicated technical features. Therefore, features defined with "first", "second" may expressly or implicitly include at least one of those features. In the description of the present application, "plurality" means at least two, such as two, three, etc., unless expressly and specifically defined otherwise.

In the present application, unless otherwise expressly specified and limited, terms "mounted", "be connected with", "be connected to", "fixed" and other terms should be interpreted in a broad sense, for example, it can be a fixed connection, a detachable connection, or an integrated; it can be a mechanical connection or an electrical connection; it can be a direct connection or an indirect connection through an intermediate medium; it may be connection within the two elements or an interaction relationship between the two elements, unless explicitly defined otherwise. For those of ordinary skill in the art, the specific meanings of the above terms in the present application can be understood according to specific situations.

Figure 1:
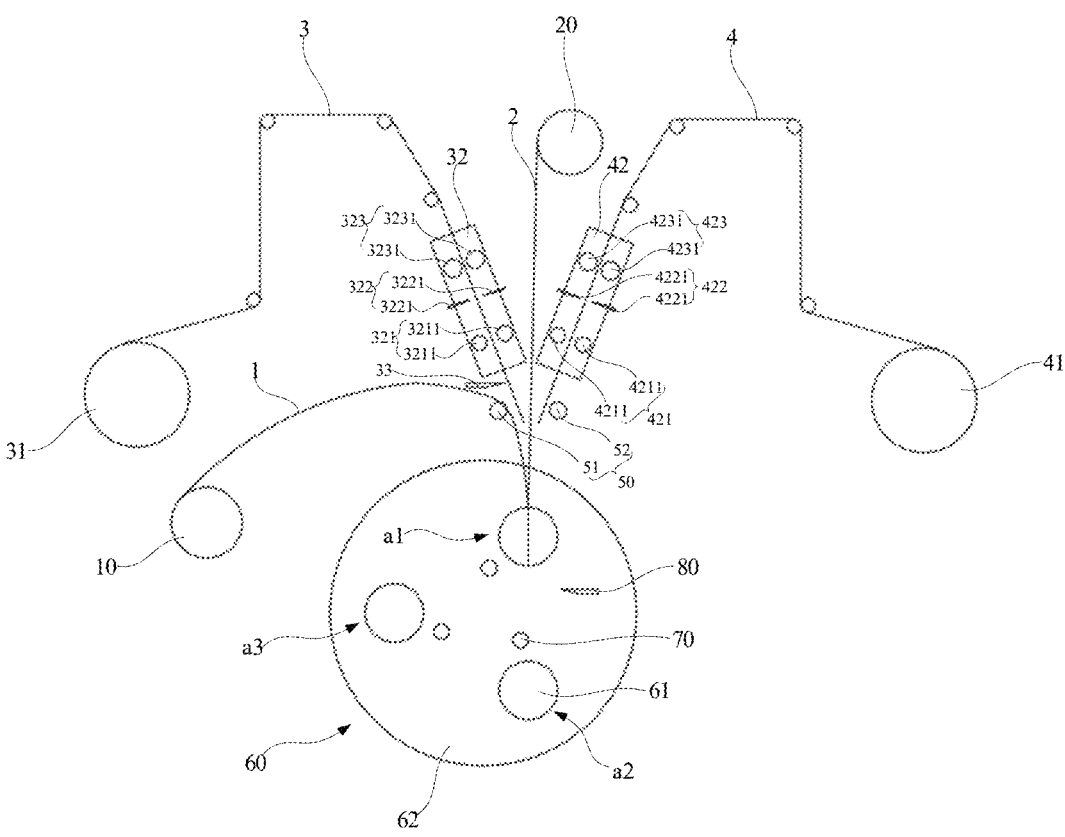
FIG. 1 is a schematic structural illustration of a winding device in an embodiment of the present application.
Figure 2:
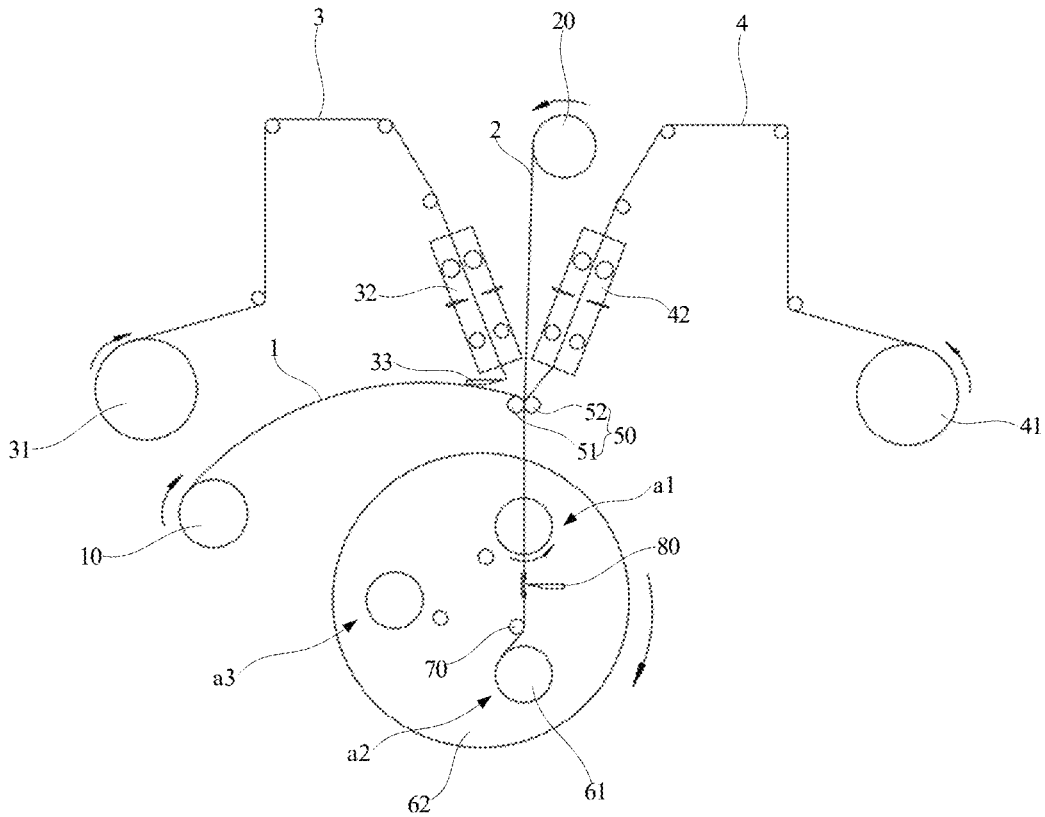
FIG. 2 is a schematic structural illustration of the winding device shown in FIG. 1 (the winding needle rotates from the first station to the second station after the winding of the cell is completed)

Referring to FIGS. 1 and 2, an embodiment of the present application provides a winding device, which includes a first unwinding equipment 10, a second unwinding equipment 31, a third unwinding equipment 20, a fourth unwinding equipment 41, a merging equipment 50, a pole-piece-inserting equipment 32, a winding equipment 60, a guiding roller 70 and a cutter equipment 80.

The first unwinding equipment 10 is configured for outputting the first diaphragm 1 downstream, and the second unwinding equipment 31 is configured for outputting the cathode pole piece 3 downstream. The third unwinding equipment 20 is configured for outputting the second diaphragm 2 downstream. The fourth unwinding equipment 41 is configured for outputting the anode pole piece 4 downstream. The merging equipment 50 is arranged downstream of the first unwinding equipment 10, the second unwinding equipment 31, the third unwinding equipment 20 and the fourth unwinding equipment 41, and is configured for merging the passing first diaphragm 1, the passing cathode pole piece 3, the passing second diaphragm 2 and the passing anode pole piece 4, or for merging the passing first diaphragm 1, the passing second diaphragm 2 and the passing anode pole piece 4. The pole-piece-inserting equipment 32 is arranged between the merging equipment 50 and the second unwinding equipment 31, so as to cut off the passing cathode pole piece 3. The pole-piece-inserting equipment 32 is also configured for transporting the starting end of the cathode pole piece 3 downstream, such that the starting end of the cathode pole piece 3 sequentially passes through the merging equipment 50 and the slit of the winding needle 61 at the first station a1 described later.

The winding equipment 60 includes a turret 62 and at least two winding needles 61 mounted on the turret 62, and each winding needle 61 can be extended or retracted relative to the turret 62. The turret 62 is rotatably provided, so as to drive each winding needle 61 to pass by the first station a1 and the second station a2 sequentially. The first station a1 is located downstream of the merging equipment 50, such that the first diaphragm 1, the second diaphragm 2 and the anode pole piece 4, which are merged by the merging equipment 50, arrive at the winding needle 61 at the first station a1, and are wound on the winding needle 61 to form a cell.

The guiding roller 70 is arranged between the first station a1 and the second station a2, for the first diaphragm 1, the second diaphragm 2 and the anode pole piece 4 between the first station a1 and the second station a2 to wind through. When the winding needle 61 located at the first station a1 rotates to the second station a2 along with the turret 62, the other winding needle 61 rotates to the first station a1, and the first diaphragm 1, the second diaphragm 2 and the anode pole piece 4 located between the first station a1 and the second station a2 wind through the guiding roller 70 so as to align the slit of the winding needle 61 at the first station a1 with the first diaphragm 1, the second diaphragm 2 and the anode pole piece 4 winding through the first station a1, such that when the winding needle 61 at the first station a1 extends, the first diaphragm 1, the second diaphragm 2 and the anode pole piece 4 can smoothly enter into the slit of the winding needle 61 to be held, thereby facilitating subsequent winding. The cutter equipment 80 is arranged between the first station a1 and the second station a2, such that after the trailing end of the cathode pole piece 3 is wound onto the winding needle 61 at the first station a1, the passing first diaphragm 1, the passing second diaphragm 2 and the passing anode pole piece 4 can be cut off in one time.

With regard to the above winding device, during actual winding operation, the first unwinding equipment 10, the second unwinding equipment 31, the third unwinding equipment 20 and the fourth unwinding equipment 41 are unwound and output the first diaphragm 1, the cathode pole piece 3, the second diaphragm 2, and the anode pole piece 4 to the merging equipment 50 respectively. The first diaphragm 1, the cathode pole piece 3, the second diaphragm 2, and the anode pole piece 4 are merged by the merging equipment 50, and the first diaphragm 1, the cathode pole piece 3, the second diaphragm 2, and the anode pole piece 4, which are merged, are further transported to the winding needle 61 at the first station a1. The winding needle 61 at the first station a1 revolves on its axis to wind the first diaphragm 1, the cathode pole piece 3, the second diaphragm 2, and the anode pole piece 4, which are merged, to form a cell.

When winding of one cell is completed, the pole-piece-inserting equipment 32 cuts off the passing cathode pole piece 3, and the winding needle 61 at the first station a1 continues winding the first diaphragm 1, the cathode pole piece 3, the second diaphragm 2, and the anode pole piece 4, until the trailing end of the cathode pole piece 3 is wrapped inside the cell formed by winding. Then, the winding needle 61 at the first station a1 rotates to the second station a2 along with the turret 62, while the other winding needle 61 rotates to the first station a1 along with the turret 62. At this time, due to the rotation of the turret 62, the first diaphragm 1, the second diaphragm 2 and the anode pole piece 4 located between the first station a1 and the second station a2 are wound around the guiding roller 70, and under the guidance of the guiding roller 70, the first diaphragm 1, the second diaphragm 2 and the anode pole piece 4 winding through the first station a1 are aligned with the slit of the winding needle 61 at the first station a1, such that when the winding needle 61 at the first station a1 extends, the first diaphragm 1, the second diaphragm 2, and the anode pole piece 4 can enter into the slit of the winding needle 61 to be clamped and fixed. Then, the cutter equipment 80 cuts off the first diaphragm 1, the second diaphragm 2 and the anode pole piece 4 between the first station a1 and the second station a2 (that is, the cutter equipment 80 cuts off the first diaphragm 1, the second diaphragm 2 and the anode pole piece 4 in one time), such that the cell on the winding needle 61 at the second station a2 is separated from the first diaphragm 1, the second diaphragm 2 and the anode pole piece 4 so as to facilitate the subsequent processing and unloading of the cell on the winding needle 61. In addition, since the first diaphragm 1, the second diaphragm 2, and the anode pole piece 4 that are downstream of the merging equipment 50 are located in the slit of the winding needle 61 at the first station a1, the winding and forming of the next cell only needs to be performed after the starting end of the cathode pole piece 3 is transported downstream by the pole-piece-inserting equipment 32 and passed through the merging equipment 50 and through the slit of the winding needle 61 at the first station a1 sequentially, without polepiece-inserting operation of the anode pole piece. That is to say, when the forming of one cell is completed, in order to further wind the next cell, the pole-piece-inserting operation only needs to be performed with the cathode pole piece 3, and does not need to be performed with the anode pole piece 4, thereby greatly reducing the transition time between forming of two cells and improves the production efficiency.

It should be noted that when the winding of the cell is completed, first of all, cut off the cathode pole piece 3, and then continue to wind the winding needle 61 until the trailing end of the cathode pole piece 3 is wrapped in the cell formed by winding. Thus, on the one hand, it is possible to prevent the cutter equipment 80 from synchronously cutting off the cathode pole piece 3 and the anode pole piece 4; on the other hand, it is possible to continuously wind the anode pole piece, which contributes to ensuring the alignment of the cathode pole piece 3 and the anode pole piece 4.

It also should be noted that in a prefer embodiment, the merging equipment 50 can sequentially merge the material strips of each layer in the following order: the first diaphragm 1, the cathode pole piece 3, the second diaphragm 2, and the anode pole piece 4. In another embodiment, the merging equipment 50 can sequentially merge the material strips of each layer in the following order: the first diaphragm 1, the anode pole piece 4, the second diaphragm 2, and the cathode pole piece 3.

It also should be noted that in other embodiments, when the winding of one cell is completed, the cathode pole piece 3 is not cut off by the pole-piece-inserting equipment 32; instead, it is cut off by a first cutting mechanism 33 which is arranged between the merging equipment 50 and the pole-piece-inserting equipment 32.

In an embodiment of the present application, the merging equipment 50 has a first merging roller 51 and a second merging roller 52 arranged oppositely. A merging passage is formed between the first merging roller 51 and the second merging roller 52, is configured for the first diaphragm 1, the cathode pole piece 3, the second diaphragm 2 and the anode pole piece 4 to pass through, or is configured for the first diaphragm 1, the second diaphragm 2, and the anode pole piece 4 to pass through. At least one of the first merging roller 51 and the second merging roller 52 can be controlled to get close to or away from the other, and each of the first merging roller 51 and the second merging roller 52 is rotatable about its own axis. In this way, initially, the first diaphragm 1 and the second diaphragm 2 output from the first unwinding equipment 10 and the third unwinding equipment 20 pass sequentially through the merging passage and the slit of the winding needle 61 at the first station a1. The pole-piece-inserting equipment 32 and the feeding equipment 42 described later insert the starting ends of the cathode pole piece 3 and the anode pole piece 4 into the merging passage, respectively. The first merging roller 51 and the second merging roller 52 are getting close to each other to clamp the first diaphragm 1, the cathode pole piece 3, the second diaphragm 2 and the anode pole piece 4 tightly, such that the first diaphragm 1, the cathode pole piece 3, the second diaphragm 2, and the anode pole piece 4 are merged. At this time, the winding needle 61 at the first station a1 revolves on its axis, and under the frictional force of the first diaphragm 1 and the second diaphragm 2, the cathode pole piece 3 and the anode pole piece 4 are driven to move together with the first diaphragm 1 and the second diaphragm 2, and then are wound onto the winding needle 61, that is, realizing the winding of the cell.

Of course, in other embodiments, the first merging roller 51 and the second merging roller 52 are getting close to each other to a position where there is a certain gap between them, and the first merging roller 51 and the second merging roller 52 do not press against the first diaphragm 1, the cathode pole piece 3, the second diaphragm 2 and an anode pole piece 4 tightly as long as the first diaphragm 1, the cathode pole piece 3, the second diaphragm 2, and the anode pole piece 4 are merged; such that the first diaphragm 1, the cathode pole piece 3, the second diaphragm 2 and the anode pole piece 4, which are merged, can smoothly enter into the slit of the winding needle 61 at the first station a1, which is not limited herein. At this time, the pole-piece-inserting operation is performed without dependence on the frictional force between the first diaphragm 1 and the second diaphragm 2, such that the starting ends of the cathode pole piece 3 and the anode pole piece 4 sequentially pass through the merging passage and the slit of the winding needle 62 at the first station a1; rather, the pole-piece-inserting operation is performed depending on downstream transporting of the cathode pole piece 3 and the anode pole piece 4 respectively by means of the pole-piece-inserting equipment 32 and the below-mentioned feeding equipment 42, such that the starting ends of the cathode pole piece 3 and the anode pole piece 4 sequentially pass through the merging passage and the slit of the winding needle 61 at the first station a1.

In the embodiment of the present application, the turret 62 is mounted with three winding needles 61 disposed at intervals in the rotational direction of the turret 62. The winding equipment 60 also has a third station a3, and the three winding needles 61 sequentially pass by the first station a1, the second station a2, and the third station a3 along with the rotating of the turret 62. And, when one of the winding needles 61 is located at the first station a1, the other two winding needles 61 are located at the second station a2 and the third station a3, respectively. As an embodiment, the first station a1 is a winding station, that is, the winding needle 61 at the first station a1 revolves on its axis to wind and form a cell; the second station a2 is a gluing station, that is, a tail tape is bonded onto the cell on the winding needle 61 at the second station a2 so as to prevent the cell from releasing; the third station a3 is a unloading station, that is, being configured for unloading the cell on the winding needle 61 at the third station a3.

In a specific embodiment, there are three guiding rollers 70, all mounted on the turret 62 to rotate along with the turret 62. Each guiding roller 70 is located between two adjacent winding needles 61, such that each time one of the winding needles 61 arrives at the first station a1, one of the guiding rollers 70 must arrive at a position between the first station a1 and the second station a2 for the first diaphragm 1, the second diaphragm 2 and the anode pole piece 4 between the first station a1 and the second station a2 to wind through, that is, guiding the first diaphragm 1, the second diaphragm 2 and the anode pole piece 4, such that when the winding needle 61 arriving at the first station a1 extends, the first diaphragm 1, the second diaphragm 2 and the anode pole piece 4 can enter into the slit of the winding needle 61.

It should be noted that in other embodiments, only the first station a1 and the second station a2 are included, and only two winding needles 61 may be mounted on the turret 62. At this time, the first station a1 is the winding station, and the second station a2 is the unloading station.

In a specific embodiment, each winding needle 61 has a first external needle, a first internal needle, a second external needle, and a second internal needle. The first external needle and the second external needle are oppositely arranged, and side surfaces of them, which are opposite to each other, are combined to form an outer contour surface for winding the cell. The first internal needle is mounted on one side of the first external needle facing the second external needle, the second internal needle is mounted on one side of the second external needle facing the first external needle, and the first internal needle and the second internal needle may move relative to each other to clamp the first diaphragm 1, the second diaphragm 2, and the anode pole piece 4 with the above slit formed between the first internal needle and the second internal needle. It should be noted that, the extension of the winding needle 61 means that the first external needle and the second external needle move in the axial direction so that the first diaphragm 1, the second diaphragm 2, and the anode pole piece 4 enter into the slit between the first internal needle and the second internal needle. The retraction of the winding needle 61 means that the first external needle and the second external needle move in opposite directions in the axial direction so that the first diaphragm 1, the second diaphragm 2, and the anode pole piece 4 exit from the slit between the first internal needle and the second internal needle.

In the embodiment of the present application, the pole-piece-inserting equipment 32 includes a first holding assembly 323, a first cutting assembly 322, and a pole-piece-inserting assembly 321. The first holding assembly 323 is arranged on the upstream side of the pole-piece-inserting assembly 321, and the first cutting assembly 322 is arranged between the first holding assembly 323 and the pole-piece-inserting assembly 321. The first holding assembly 323 is configured for clamping or releasing the passing cathode pole piece 3, and can be controlled to get close to or away from the first cutting assembly 322. The first cutting assembly 322 is configured for cutting the passing cathode pole piece 3, and the pole-piece-inserting assembly 321 is configured for transporting the passing cathode pole piece 3 downstream.

In a specific embodiment, the pole-piece-inserting assembly 321 has two pole-piece-inserting rollers 3211 disposed oppositely. A first transporting passage is formed between the two pole-piece-inserting rollers 3211 for the cathode pole piece 3 to pass through. At least one of the two pole-piece-inserting rollers 3211 can be controlled to get close to or away from the other one, and both pole-piece-inserting rollers 3211 can rotate around their own axes. In this way, when the pole-piece-inserting operation (that is, the starting end of the cathode pole piece 3 sequentially passes through the merging equipment 50 and the slit of the winding needle 61 at the first station a1) is required, the two pole-piece-inserting rollers 3211 are getting close to each other until the cathode pole piece 3 is clamped, and the two pole-piece-inserting rollers 3211 rotate in opposite directions about their axes so as to transport the cathode pole piece 3 downstream toward the merging equipment 50, such that the starting end of the cathode pole piece 3 is inserted into the merging equipment 50.

It should be noted that one of the two pole-piece-inserting rollers 3211 is a driving roller and the other is a driven roller. When the two pole-piece-inserting rollers 3211 clamp the cathode pole piece 3, the driving roller is driven to rotate around its own axis so as to drive the driven roller to rotate reversely around its own axis (for example, when the driving roller rotates clockwise, the driven roller rotates counterclockwise), causing the cathode pole piece 3 to pass through the first material-transporting passage and move downstream, and in turn pass through the merging equipment 50 and the slit of the winding needle 61 at the first station a1 sequentially. Of course, in other embodiments, the two pole-piece-inserting rollers 3211 may also be driving rollers, as long as it is possible to enable the cathode pole piece 3 to pass through the merging equipment 50 and the slit of the winding needle 61 at the first station a1, which is not limited herein.

Further, the two pole-piece-inserting rollers 3211 of the pole-piece-inserting assembly 321 can be controlled to move along their own axes, so as to drive the cathode pole piece 3 clamped by the two pole-piece-inserting rollers 3211 for alignment.

Next, an actual operation process of the pole-piece-inserting equipment 32 will be described. When the winding of a cell is completed, the first cutting assembly 322 cuts off the passing cathode pole piece 3, and the winding needle 61 at the first station a1 continues winding the first diaphragm 1, the cathode pole piece 3, the second diaphragm 2, and the anode pole piece 4, until the trailing end of the cathode pole piece 3 is wrapped inside the cell formed by winding.

The pole-piece-inserting operation of the cathode pole piece 3 is required before rewinding the next cell, and the first holding assembly 323 clamps the passing cathode pole piece 3 during the pole-piece-inserting operation, and move toward the first cutting assembly 322, such that the starting end of the cathode pole piece 3 sequentially passes through the first cutting assembly 322 and the first transporting passage of the pole-piece-inserting assembly 321. Then, the two pole-piece-inserting rollers 3211 of the pole-piece-inserting assembly 321 clamp the cathode pole piece 3, and the first holding assembly 323 releases the cathode pole piece 3 and restores to the initial position. The two pole-piece-inserting rollers 3211 move along their own axial direction for alignment, and then rotate in opposite directions after being corrected in place so as to drive the cathode pole piece 3 to move downstream until the starting end of the cathode pole piece 3 sequentially passes through the merging equipment 50 and the slit of the winding needle 61 at the first station a1, thereby completing the pole-piece-inserting operation.

More specifically, the first holding assembly 323 has two first holding members 3231 disposed oppositely. A first holding passage is formed between the two first holding members 3231 for the cathode pole piece 3 to pass through, and at least one of the two first holding members 3231 can be controlled to get close to or away from the other one, thereby clamping or releasing the cathode pole piece 3 in the first holding passage.

More specifically, the first cutting assembly 322 has two first cutters 3221 disposed oppositely. A first cutting passage is formed between the two first cutters 3221 for the cathode pole piece 3 to pass through, and one of the two first cutters 3221 can be controlled to get close to or away from the other one, so as to realize cutting of the cathode pole piece 3 in the first cutting passage. It should be noted that in other embodiments, the first cutting assembly 322 may also adopt other types of cutting configuration as long as it can cut off the cathode pole piece 3, which is not limited herein.

Figure 3:
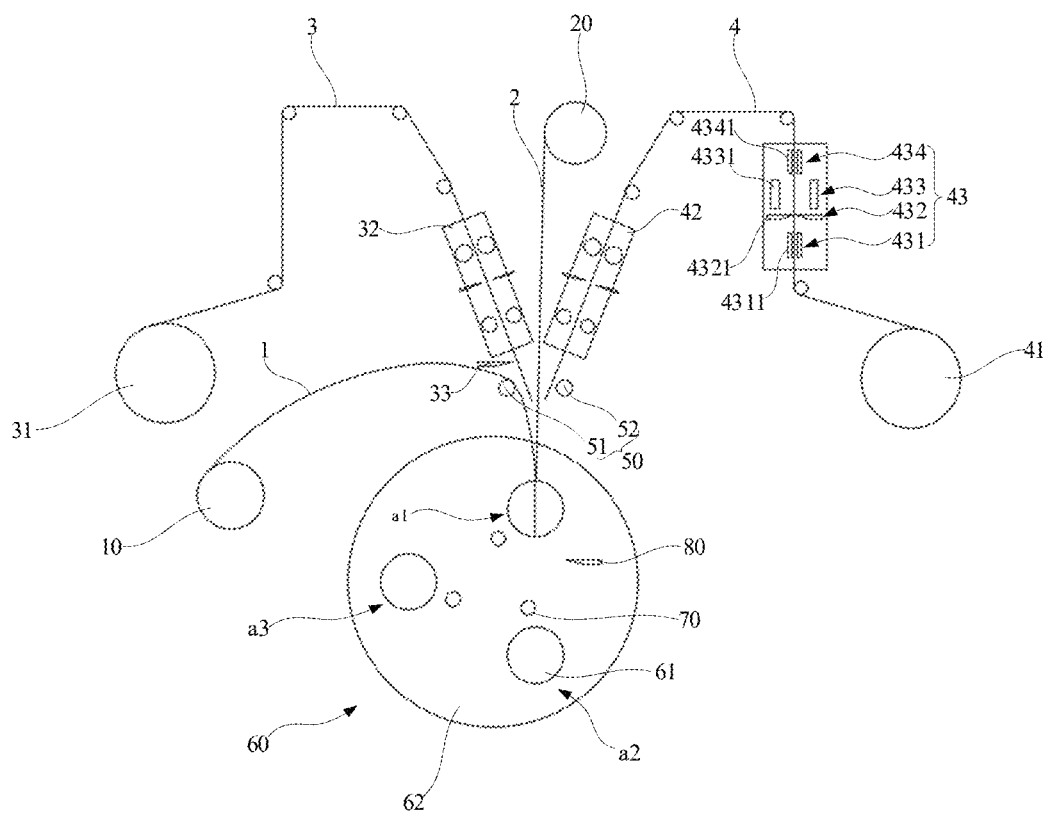
FIG. 3 is a schematic structural illustration of a winding device in another embodiment of the present application.
Figure 4:
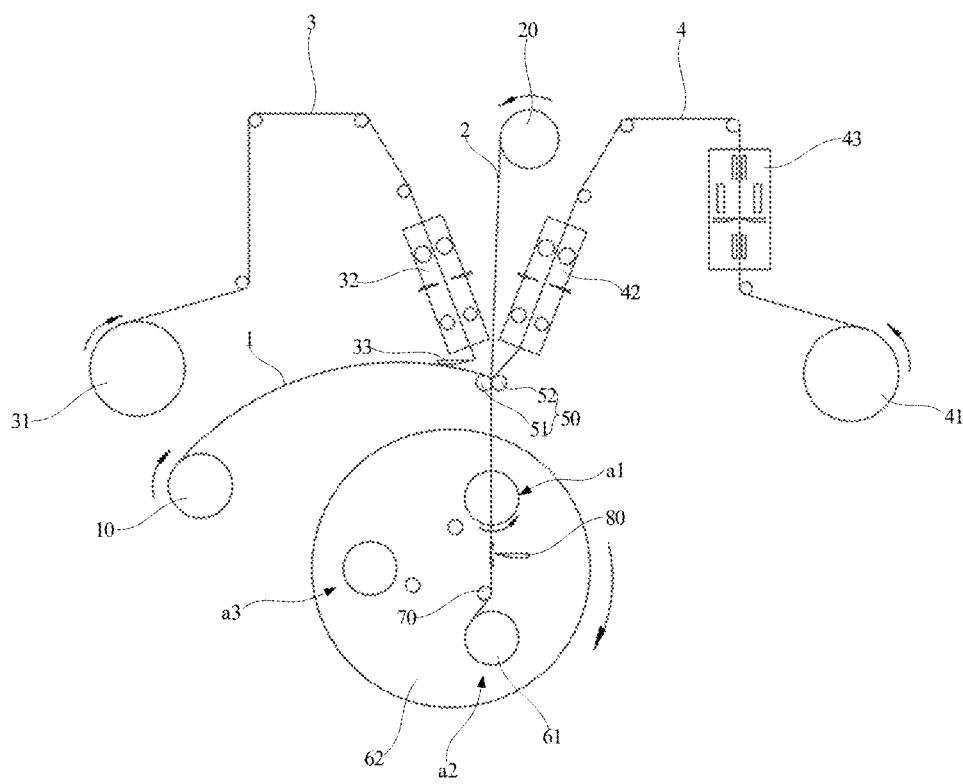
FIG. 4 is a schematic structural illustration of the winding device shown in FIG. 3 (the winding needle rotates from the first station to the second station after the winding of the cell is completed)

Referring to FIGS. 3 and 4, in other embodiments, the winding device further includes a pole-piece-processing equipment 43 arranged between the fourth unwinding equipment 41 and the merging equipment 50. The pole-piece-processing equipment 43 is configured for cutting off the passing anode pole piece 4, separating an upstream cut-off end d1 (see FIG. 5) and a downstream cut-off end d2 (see FIG. 5) formed by cutting off the anode pole piece 4 from each other, and connecting the upstream cut-off end d1 and the downstream cut-off end d2 with the tape. The tape between the upstream cut-off end d1 and the downstream cut-off end d2 forms the tape portion. The above cutter equipment 80 is configured for cutting off the passing first diaphragm 1, the passing second diaphragm 2, and the tape portion on the passing anode pole piece 4 in one time.

In this way, before the anode pole piece 4 entering into the merging equipment 50, the pole-piece-processing equipment 43 first cuts off the passing anode pole piece 4, then separates the upstream cut-off end d1 and the downstream cut-off end d2 formed by cutting off the anode pole piece 4 from each other (i.e., they are separated from each other by a certain distance), and then bonds the separated upstream cut-off end d1 to the downstream cut-off end d2 with the tape. The cutter equipment 80 cuts off the first diaphragm 1, the second diaphragm 2, and the tape portion on the anode pole piece 4 at the position of the tape. After the first diaphragm 1, the second diaphragm 2, and the tape portion on the anode pole piece 4 are cut off, the upstream cut-off end d1 and the downstream cut-off end d2 of the anode pole piece 4 are still wrapped by the tape, which prevents burrs of the upstream cut-off end d1 and the downstream cut-off end d2 from being exposed, and in turn prevents the burrs from adversely affecting the quality and safety of the cell, that is, contributing to improve the quality and safety of cell.

In a specific embodiment, the pole-piece-processing equipment 43 includes sequentially from upstream to downstream a first holding-transporting assembly 431, a cutter assembly 432, a gluing assembly 433 and a second holding-transporting assembly 434. The first holding-transporting assembly 431 and the second holding-transporting assembly 434 are both configured for holding the passing anode pole piece 4 and are both capable of moving downstream. The cutter assembly 432 is configured for cutting off the passing anode pole piece 4, the cut off anode pole piece 4 forming the upstream cut-off end d1 and the downstream cut-off end d2. Here, when the first holding-transporting assembly 431 and the second holding-transporting assembly 434 move downstream, the upstream cut-off end d1 and the downstream cut-off end d2 can be respectively driven to move to the gluing assembly 433 and separated from each other. The gluing assembly 433 is configured for bonding the upstream cut-off end d1 to the downstream cut-off end d2 with the tape, such that the upstream cut-off end d1 and the downstream cut-off end d2 are reconnected by the tape.

In this way, when processing the anode pole piece 4, first, the first holding-transporting assembly 431 and the second holding-transporting assembly 434 clamp the anode pole piece 4, respectively. Then, the cutter assembly 432 cuts off the passing anode pole piece 4, and the cut anode pole piece 4 forms the upstream cut-off end d1 and the downstream cut-off end d2, and at this time the upstream cut-off end d1 is held by the first holding-transporting assembly 431 while the downstream cut-off end d2 is held by the second holding-transporting assembly 434. Further, the upstream cut-off end d1 and the downstream cut-off end d2 held by the first holding-transporting assembly 431 and the second holding-transporting assembly 434 respectively move downstream until they reach the gluing assembly 433, and they are spaced apart from each other. Still further, the gluing assembly 433 bond the upstream cut-off end d1 to the downstream cut-off end d2 with the tape, such that the upstream cut-off end d1 and the downstream cut-off end d2 are reconnected by the tape. Finally, the first holding-transporting assembly 431 and the second holding-transporting assembly 434 release the anode pole piece 4 and return to the initial position, and at this time, the processing of the anode pole piece 4 is completed once.

In a specific embodiment, when the first holding-transporting assembly 431 and the second holding-transporting assembly 434 respectively drive the upstream cut-off end d1 and the downstream cut-off end d2 to move to the gluing assembly 433, the second holding-transporting assembly 434 moves a distance greater than that the first holding-transporting assembly 431 moves, that is, the downstream cut-off end d2 moves a distance greater than that the upstream cut-off end d1 moves, such that the upstream cut-off end d1 and the downstream cut-off end d2 are separated from each other when reaching the gluing assembly 433.

Figure 5:
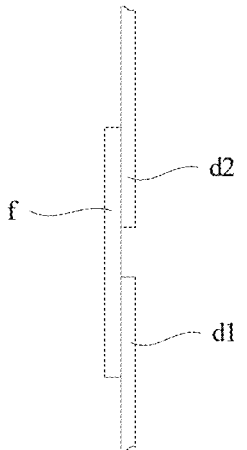
FIG. 5 is a schematic illustration of a gluing method of the pole-piece-processing equipment of the winding device shown in FIG. 3.

Referring to FIG. 5, in a specific embodiment, the gluing assembly 433 is configured for bonding the upstream cut-off end d1 to the downstream cut-off end d2 with the tape f from one side of the anode pole piece 4, and thus, the upstream cut-off end d1 and the downstream cut-off end d2 of the anode pole piece 4 are connected with the tape f bonded on one side. Accordingly, since the tape portion of the anode pole piece 4 has only one layer of tape, after the first diaphragm 1, the second diaphragm 2, and the anode pole piece 4 are merged by the merging equipment 50, a thinner thickness at the tape portion is exhibited by merging of the first diaphragm 1, the second diaphragm 2 and the anode pole piece 4, thereby facilitating cutting action of the cutter equipment 80 and improves cutting quality.

Figure 6:
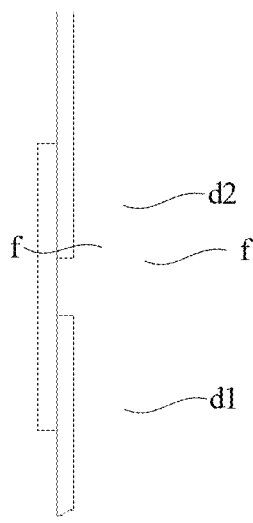
FIG. 6 is a schematic illustration of another gluing method of the pole-piece-processing equipment of the winding device shown in FIG. 3.

Referring to FIG. 6, in another specific embodiment, the gluing assembly 433 is configured for bonding the upstream cut-off end d1 to the downstream cut-off end d2 with two tapes f respectively from two sides of the anode pole piece 4, so as to connect the upstream cut-off end d1 and the downstream cut-off end d2 by the two tapes f on both sides of the anode pole piece 4, such that the upstream cut-off end d1 and the downstream cut-off end d2 are firmly connected. At this time, the tape portion on the anode pole piece 4 has two layers of tape.

Figure 7:
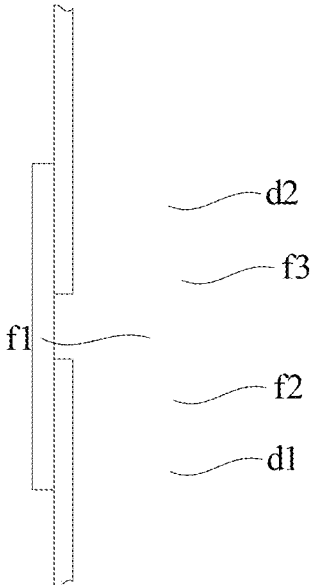
FIG. 7 is a schematic illustration of yet another gluing method of the pole-piece-processing equipment of the winding device shown in FIG. 3.

Referring to FIG. 7, in yet another specific embodiment, the tape includes a first tape f1, a second tape f2, and a third tape f3. The gluing assembly 433 is configured for bonding the upstream cut-off end d1 to the downstream cut-off end d2 with the first tape f1 from a first side of the anode pole piece 4, bonding the upstream cut-off end d1 to the first tape f1 with the second tape f2 from a second side of the anode pole piece 4, and bonding the downstream cut-off end d2 to the first tape f1 with the third tape f3 from the second side of the anode pole piece 4. Here, the first side and the second sides of the anode pole piece 4 face away from each other. The tape portion is a portion of the first tape f1 located between the second tape f2 and the third tape f3. In this way, the upstream cut-off end d1 and the downstream cut-off end d2 are connected by one long tape (i.e., the first tape f1) and two short tapes (i.e., the second tape f2 and the third tape f3). Accordingly, on one hand, the upstream cut-off end d1 and the downstream cut-off end d2 are firmly connected; and on the other hand, since the tape portion is of a thinner thickness, a thinner thickness at a position between the two short tapes is exhibited by merging of the first diaphragm 1, the second diaphragm 2, and the anode pole piece 4, thereby facilitating the cutter equipment 80 to cut off the first diaphragm 1, the second diaphragm 2 and the anode pole piece 4 at the position between the two short tapes (i.e., at the tape portion) and ensuring cutting quality.

Further, there are arranged sequentially a first gluing area, a non-gluing area, and a second gluing area on a side of the first tape f1 facing the anode pole piece 4. The first gluing area is bonded to the downstream cut-off end d2, and the second gluing area is bonded to the upstream cut-off end d1. One end of the third tape f3 is bonded to the downstream cut-off end d2, and the other end is bonded to the first gluing area. One end of the second tape f2 is bonded to the upstream cut-off end d1, and the other end is bonded to the second gluing area. In this way, the area between the second tape f2 and the third tape f3 and corresponding to the first tape f1 is the non-gluing area, so as to prevent the first tape f1 from being adhered to other elements during tape-running.

Continuing to FIGS. 3 and 4, in a specific embodiment, the first holding-transporting assembly 431 has two first clamping members 4311 disposed oppositely, which form a first holding-transporting passage therebetween for the anode pole piece 4 to pass through. At least one of the two first clamping members 4311 can be controlled to get close to or away from the other one, so as to clamp or release the anode pole piece 4.

In a specific embodiment, the second holding-transporting assembly 434 has two second clamping members 4341 disposed oppositely, which form a second holding-transporting passage therebetween for the anode pole piece 4 to pass through. At least one of the two second clamping members 4341 can be controlled to get close to or away from the other one, so as to clamp or release the anode pole piece 4.

In a specific embodiment, the cutter assembly 432 has two second cutters 4321 disposed oppositely, which form a second cutting passage therebetween for the anode pole piece 4 to pass through. One of the two second cutters 4321 can be controlled to get close to or away from the other one, so as to realize a cut-off action of cutting off the anode pole piece 4. It should be noted that in other embodiments, the cutter assembly 432 may have other configuration as long as it can cut off the anode pole piece 4, for example, a structure of cutting the anode pole piece 4 in the width direction of the anode pole piece 4 with a cutter, which is not limited herein.

In a specific embodiment, the gluing assembly 433 has two tape-adsorbing members 4331 disposed oppositely, which form a tape-bonding passage therebetween for the anode pole piece 4 to pass through, and are both configured for adsorbing the tape. It can be understood that when the tape is used at a single side, one of the tape-adsorbing members 4331 adsorbs the tape, while the other second tape-adsorbing member 4331 does not adsorb the tape. When the tape is used at both sides, the two tape-adsorbing members 4331 both adsorb the tape. When it is in a way of bonding the long tape to the short tape, one of the tape-adsorbing members 4331 adsorbs one first tape, while the other second tape-adsorbing member 4331 adsorbs the second tape and the third tape.

The two tape-adsorbing members 4331 can be controlled to get close to or away from the other one, so as to bond the adsorbed tape to the upstream cut-off end d1 and the downstream cut-off end d2 of the anode pole piece 4.

Referring to FIG. 1, in the embodiment of the present application, the winding device also includes a feeding equipment 42 arranged between the pole-piece-processing equipment 43 and the merging equipment 50. The feeding equipment 42 includes a feeding assembly 421 with two feeding rollers 4211 disposed oppositely, and the two feeding rollers 4211 form a second material-transporting passage therebetween for the anode pole piece 4 to pass through. At least one of the two feeding rollers 4211 can be controlled to get close to or away from the other one, and both can rotate around its own axis. In this way, when the feeding operation is required (i.e., the starting end of the anode pole piece passes through the merging equipment 50 and the slit of the winding needle 61 at the first station a1 sequentially), the two feeding rollers 4211 are getting close to each other until the anode pole piece 4 is clamped, and the two feeding rollers 4211 rotate in opposite directions about their axes to each other, so as to transport the anode pole piece 4 downstream until the starting end of the anode pole piece 4 passes through the merging equipment 50 and the slit of the winding needle 61 at the first station a1 sequentially.

It should be noted that one of the two feeding rollers 4211 is a driving roller, and the other is a driven roller. When the two feeding rollers 4211 clamp the anode pole piece 4, the driving roller is driven to rotate around its own axis so as to drive the driven roller to rotate reversely around its own axis (for example, when the driving roller rotates clockwise, the driven roller rotates counterclockwise), thereby driving the anode pole piece 4 to pass through the second material-transporting passage and move downstream, and in turn pass through the merging equipment 50 and the slit of the winding needle 61 at the first station a1 sequentially. Of course, in other embodiments, both of the two feeding rollers 4211 may be driving rollers, as long as the anode pole piece 4 can pass through the merging equipment 50 and the slit of the winding needle 61 at the first station a1, which is not limited herein.

Further, the two feeding rollers 4211 of the feeding assembly 421 can be controlled to move along their own axes, so as to drive the anode pole piece 4 clamped by the two feeding rollers 4211 for alignment.

In a specific embodiment, the feeding equipment 42 further includes a second holding assembly 423 and a second cutting assembly 422. The second holding assembly 423 is arranged upstream of the feeding assembly 421, and the second cutting assembly 422 is arranged between the second holding assembly 423 and the feeding assembly 421. The second holding assembly 423 is configured for clamping or releasing the passing anode pole piece 4, and can be controlled to get close to or away from the second cutting assembly 422. The second cutting assembly 422 is configured for cutting off the passing anode pole piece 4.

In this way, when a feeding operation is required (that is, an initial stage of winding operation), the second holding assembly 423 clamps the passing anode pole piece 4 and moves toward the second cutting assembly 422, such that the starting end of the anode pole piece 4 penetrates into the second cutting assembly 422. The second cutting assembly 422 is then used to cut off the anode pole piece 4 to remove the scrap section of the starting end of the anode pole piece 4. The second holding assembly 423 then continues moving toward the second cutting assembly 422, such that the starting end of the anode pole piece 4 passes through the second cutting assembly 422 and the second material-transporting passage of the feeding assembly 421 sequentially. Then, the two feeding rollers 4211 of the feeding assembly 421 clamp the anode pole piece 4, and the second holding assembly 423 releases the cathode pole piece 3 and returns to the initial position. The two feeding rollers 4211 move along the axial direction for alignment, and then rotate in opposite directions after being corrected to the proper position, so as to drive the anode pole piece 4 to move downstream, until the starting end of the anode pole piece 4 passes through the merging equipment 50 and the slit of the winding needle 61 at the first station a1 sequentially, thereby completing the feeding operation.

More specifically, the second holding assembly 423 has two second holding members 4231 provided oppositely, which form a second holding passage therebetween for the anode pole piece 4 to pass through, and at least one of which can be controlled to get close to or away from the other one, so as to clamp or release the anode pole piece 4 in the second holding passage.

More specifically, the second cutting assembly 422 has two third cutters 4221 disposed oppositely, which form a third cutting passage therebetween for the anode pole piece 4 to pass through, and at least one of which can be controlled to get close to or away from the other one, so as to cut the anode pole piece 4 in the third cutting passage. It should be noted that in other embodiments, the second cutting assembly 422 may also adopt other types of cutting configuration as long as the cathode pole piece 3 can be cut, which is not limited herein.

The technical features of the above embodiments can be combined arbitrarily. In order to simplify the description, all possible combinations of the technical features in the above embodiments are not described. However, as long as there is no contradiction in the combination of these technical features, it should be considered as a scope of this description.

The above embodiments only express several embodiments of the present application, and the description is more specific and detailed, but it cannot be understood as a limitation on the scope of the present application. It should be noted that for those skilled in the art, several modifications and improvements can be made without departing from a concept of the present application, which belong to a protective scope of the present application. Therefore, the protective scope of the present application shall be subject to the appended claims.

The invention claimed is:

1. A winding device, comprising:
   a first unwinding equipment, a second unwinding equipment, a third unwinding equipment and a fourth unwinding equipment, respectively configured for outputting a first diaphragm, a cathode pole piece, a second diaphragm and an anode pole piece;
   a merging equipment, arranged downstream of the first unwinding equipment, the second unwinding equipment, the third unwinding equipment and the fourth unwinding equipment, and configured for merging the first diaphragm, the cathode pole piece, the second diaphragm, and the anode pole piece as each passes through the merging equipment, or configured for merging the first diaphragm, the second diaphragm and the anode pole piece as each passes through the merging equipment;
   a pole-piece-inserting equipment, arranged between the merging equipment and the second unwinding equipment, configured for cutting off the cathode pole piece upon passing through the pole-piece-inserting equipment, and further configured for transporting a starting end of the cathode pole piece downstream to the merging equipment;
   a winding equipment, comprising a turret and at least two winding needles which comprise a first winding needle and a second winding needle mounted on the turret; the turret being rotatably provided so as to drive each of the at least two winding needles to pass by a first station and a second station sequentially, and the first station being located downstream of the merging equipment;
   a guiding roller, arranged between the first station and the second station; when the first winding needle at the first station rotates to the second station along with the turret, the second winding needle rotates to the first station, and the first diaphragm, the second diaphragm and the anode pole piece, which are located between the first station; and the second station, wind through the guiding roller; the guiding roller configured for guiding the first diaphragm, the second diaphragm, and the anode pole piece to pass by the first station so the first diaphragm, the second diaphragm, and the anode pole piece are positioned to be held by one of the at least two winding needles at the first station; and a cutter equipment, arranged between the first station and the second station, and configured for cutting off the first diaphragm, the second diaphragm, and the anode pole piece in one time as they pass through the cutter equipment after winding of a trailing end of the cathode pole piece onto the winding needle at the first station, wherein the winding device further comprises a pole-piece-processing equipment arranged between the fourth unwinding equipment and the merging equipment;

wherein the pole-piece-processing equipment comprises a first holding-transporting assembly, a cutter assembly, a gluing assembly, and a second holding-transporting assembly disposed sequentially from upstream to downstream;

both the first holding-transporting assembly and the second holding-transporting assembly are configured for holding the anode pole piece as it passes through the first holding-transporting assembly and the second holding transporting assembly, the cutter assembly being configured for cutting off the anode pole piece as it passes through the cutter assembly forming an upstream cut-off end and a downstream cut-off end of the anode pole piece; and the first holding-transporting assembly and the second holding-transporting assembly are adapted to move downstream at the same time to drive the upstream cut-off end and the downstream cut-off end respectively to move from the cutting assembly to the gluing assembly while separating the upstream cut-off end and the downstream cut-off end from each other, and the gluing assembly is configured for bonding the upstream cut-off end to the downstream cut-off end with a tape.

2. The winding device of claim 1, wherein the pole-piece-inserting equipment comprises a first holding assembly, a first cutting assembly and a pole-piece-inserting assembly, the first holding assembly is arranged on an upstream side of the pole-piece-inserting assembly, and the first cutting assembly is arranged between the first holding assembly and the pole-piece-inserting assembly; and the first holding assembly is configured for clamping or releasing the cathode pole piece as it passes through the first holding assembly and is adapted to get close to or away from the first cutting assembly, the first cutting assembly is configured for cutting off the cathode pole piece as it passes through the first cutting assembly, and the pole-piece-inserting assembly is configured for transporting the cathode pole piece downstream as it passes through the pole-piece-inserting assembly.

3. The winding device of claim 2, wherein the pole-piece-inserting assembly has two pole-piece-inserting rollers provided oppositely, the two pole-piece-inserting rollers forming a first transporting passage therebetween for the cathode pole piece to pass through, and at least one of the two pole-piece-inserting rollers is adapted to get close to or away from the other one, and each of the two pole-piece-inserting rollers is rotatable about its own axis.

4. The winding device of claim 3, wherein the two pole-piece-inserting rollers are adapted to move along its axial direction so as to drive the cathode pole piece clamped by the two pole-piece-inserting rollers for alignment.

5. The winding device of claim 1, wherein the tape between the upstream cut-off end and the downstream cut-off end forms a tape portion; and the cutter equipment is configured for cutting off the passing first diaphragm, the passing second diaphragm, and the tape portion on the passing anode pole piece in one time as they pass through the cutter equipment.

6. The winding device of claim 1, wherein when the first holding-transporting assembly and the second holding-transporting assembly drive the upstream cut-off end and the downstream cut-off end respectively to move to the gluing assembly, the second holding-transporting assembly moves a distance greater than that the first holding-transporting assembly moves.

7. The winding device of claim 1, wherein the gluing assembly is configured to bond the tape to one side of the upstream cut-off end and the downstream cut-off end.

8. The winding device of claim 1, wherein the gluing assembly is configured to bond the tape to both sides of the upstream cut-off end and the downstream cut-off end.

9. The winding device of claim 1, wherein the tape comprises a first tape, a second tape, and a third tape, the gluing assembly is configured to bond the first tape to a first side of the upstream cut-off end and the downstream cut-off end, and is configured to bond the second tape to a second side of the upstream cut-off end and the first tape, and is configured to bond the third tape to the second side of the downstream cut-off end and the first tape.

10. The winding device of claim 1, wherein the winding device further comprises a feeding equipment arranged between the fourth unwinding equipment and the merging equipment; and the feeding equipment comprises a feeding assembly having two feeding rollers provided oppositely, the two feeding rollers form a second transporting passage for the anode pole piece to pass through, at least one of the two feeding rollers is adapted to get close to or away from the other one, and each of the two feeding rollers is rotatable about its own axis.

11. The winding device of claim 10, wherein the feeding equipment further comprise a second holding assembly arranged on an upstream side of the feeding assembly, and a second cutting assembly arranged between the second holding assembly and the feeding assembly; and the second holding assembly is configured for clamping or releasing the anode pole piece as it passes through the second holding assembly, and is adapted to get close to or away from the second cutting assembly, and the second cutting assembly is configured for cutting off the anode pole piece as it passes through the second cutting assembly.

12. The winding device of claim 10, wherein the two feeding rollers are adapted to move along its axial direction so as to drive the anode pole piece clamped by the two feeding rollers for alignment.

13. The winding device of claim 1, wherein the merging equipment has a first merging roller and a second merging roller disposed oppositely, and the first merging roller and the second merging roller form a merging passage therebetween, and the merging passage is configured for the first diaphragm, the cathode pole piece, the second diaphragm, and the anode pole piece to pass through, or is configured for the first diaphragm, the second diaphragm, and the anode pole piece to pass through;

at least one of the first merging roller and the second merging roller is adapted to get close to or away from the other one, and both the first merging roller and the second merging roller are rotatable about their own axes.

14. The winding device of claim 1, wherein the turret is mounted with three winding needles disposed at intervals in a rotating direction of the turret; the winding equipment further has a third station, and during rotating along with the turret, the three winding needles pass by the first station, the second station, and the third station sequentially; when one of the winding needles is located at the first station, the other two winding needles are respectively located at the second station and the third station; and wherein there are provided three guiding rollers, and there are provided with the guiding roller between each adjacent two winding needles.

\* \* \* \* \*